United States Patent [19]

Wuertele et al.

[11] Patent Number: 5,033,914
[45] Date of Patent: Jul. 23, 1991

[54] HIGH EFFICIENCY FEEDER APPARATUS FOR PNEUMATIC CONVEYING LINES

[75] Inventors: Frederick S. Wuertele; Joseph J. Zitek, both of York, Nebr.

[73] Assignee: Cyclonaire Corporation, York, Nebr.

[21] Appl. No.: 414,849

[22] Filed: Sep. 29, 1989

[51] Int. Cl.$^5$ ............................................. B65G 53/40
[52] U.S. Cl. .................................. 406/109; 406/146; 406/153; 406/172; 222/61
[58] Field of Search ............... 406/109, 153, 171, 146, 406/172, 173, 151, 168; 222/61 X, 394

[56] References Cited

U.S. PATENT DOCUMENTS

| | | | |
|---|---|---|---|
| 2,674,342 | 4/1954 | Antonelli | 406/172 |
| 3,372,958 | 3/1968 | Black | 406/109 |
| 3,393,943 | 7/1968 | Kelly | 406/109 |
| 3,424,501 | 1/1969 | Young | 406/109 |
| 3,620,575 | 11/1971 | McIver et al. | 406/109 |
| 3,861,830 | 1/1975 | Johnson | 406/146 |
| 4,247,228 | 1/1981 | Gray et al. | 406/109 |
| 4,466,760 | 8/1984 | Feldsted | 406/41 |
| 4,501,518 | 2/1985 | Smith | 406/109 |
| 4,599,016 | 7/1986 | Medemblik | 406/67 |
| 4,812,086 | 3/1989 | Kopernicky | 406/153 |

Primary Examiner—Joseph F. Peters, Jr.
Assistant Examiner—Christopher P. Ellis
Attorney, Agent, or Firm—Welsh & Katz, Ltd.

[57] ABSTRACT

An apparatus is disclosed for pneumatically conveying dry particulate material from a source to a destination by cyclically loading and unloading a transfer vessel. The loading stage is accomplishing by creating a vacuum pressure within the transfer vessel to pull material into it, and after it is filled to its optimum capacity, switch a number of valves to convert the apparatus to the unloading stage wherein positive pressure is applied to the interior of the vessel to push the material down the output conveying line to its destination. The motive force in the operation of both stages is positive air pressure. The vacuum is generating by a high velocity venturi structure in combination with valving and piping which uses the positive air pressure. The unloading stage of operation utilizes the dense phase conveying, which is high pressure, low volume conveying.

14 Claims, 3 Drawing Sheets

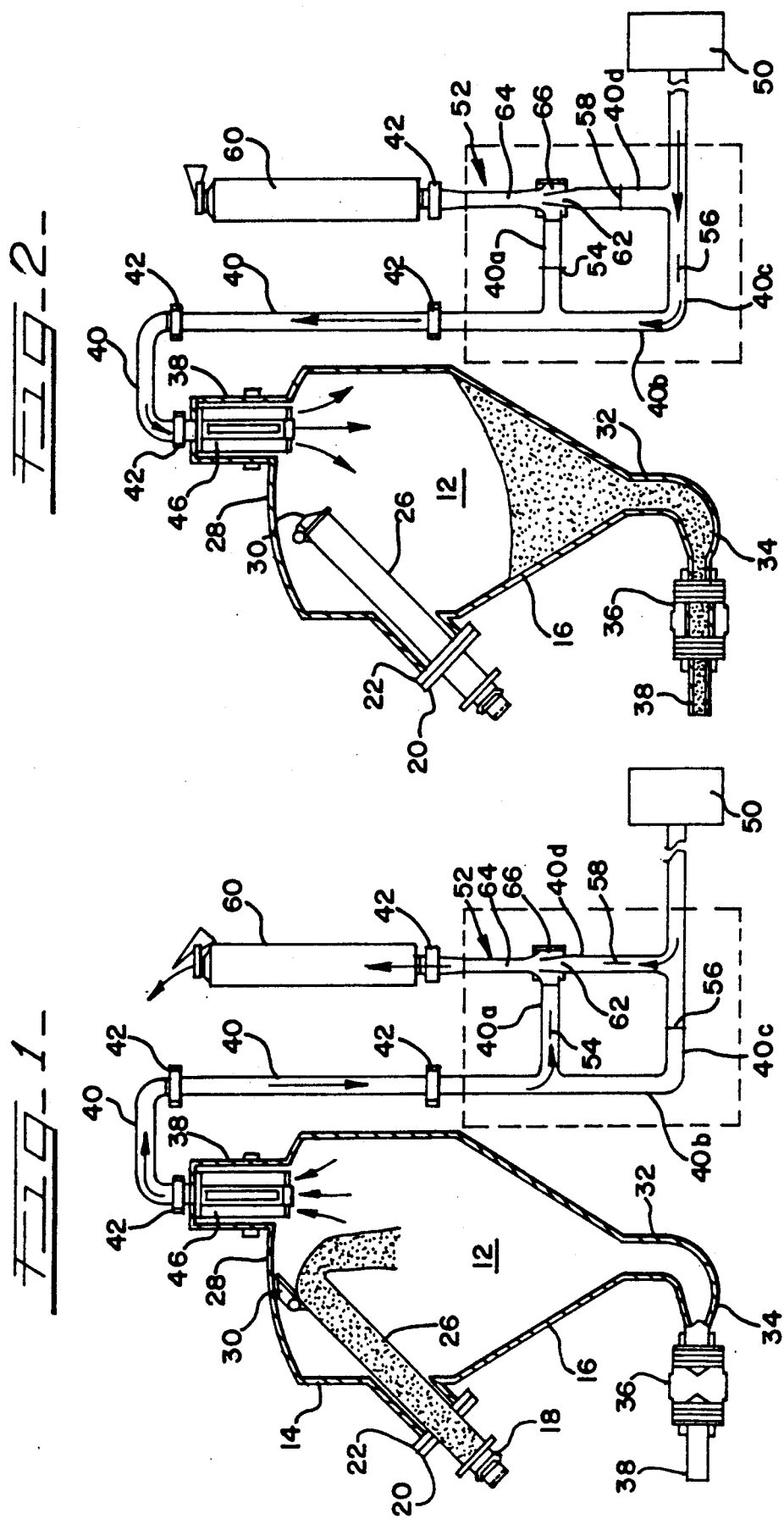

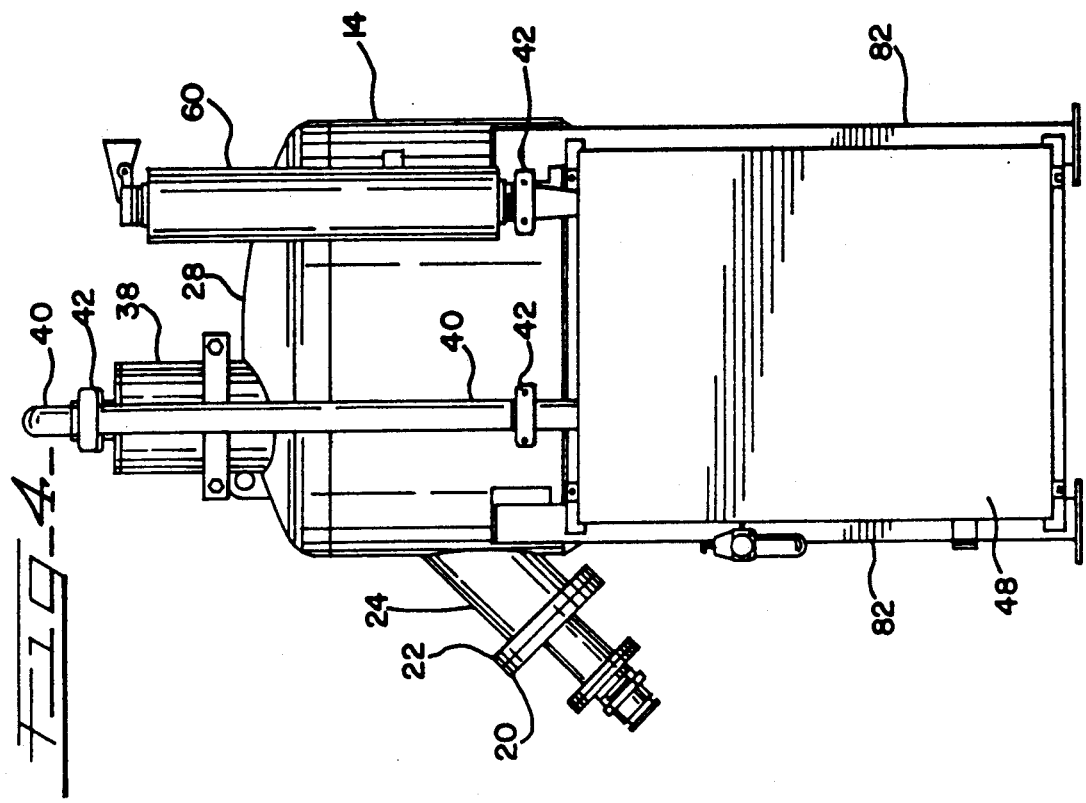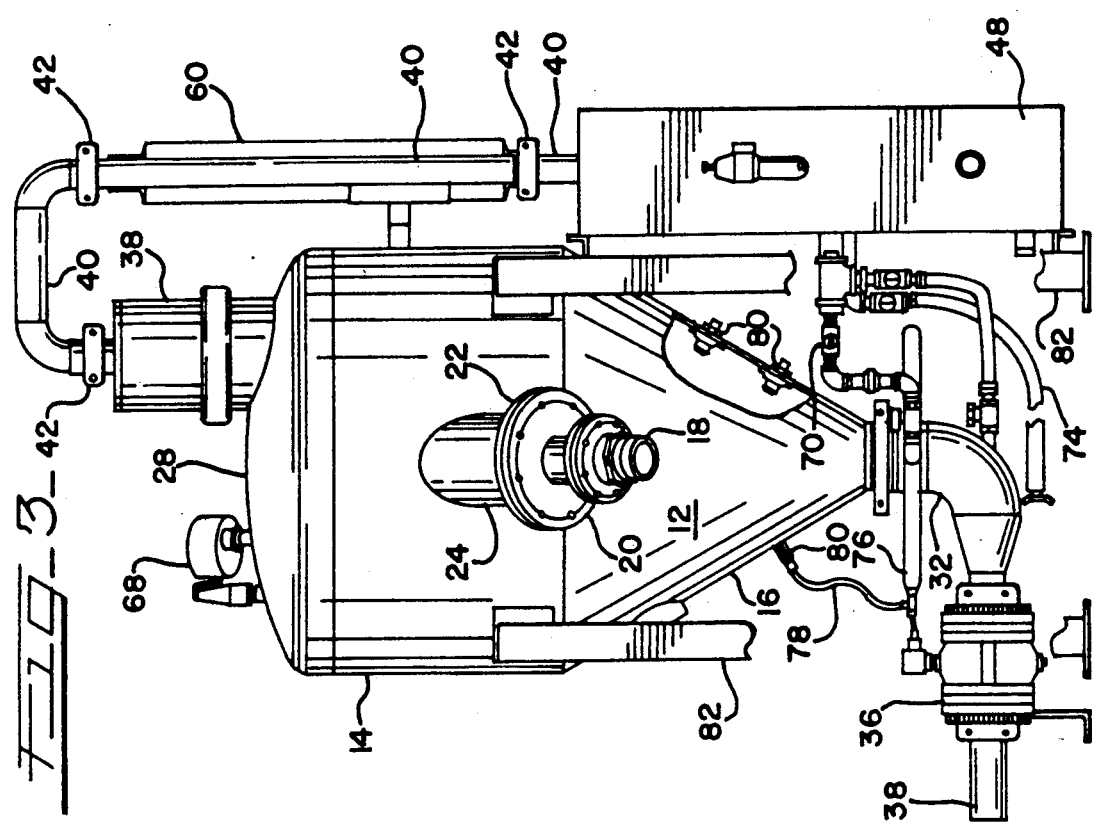

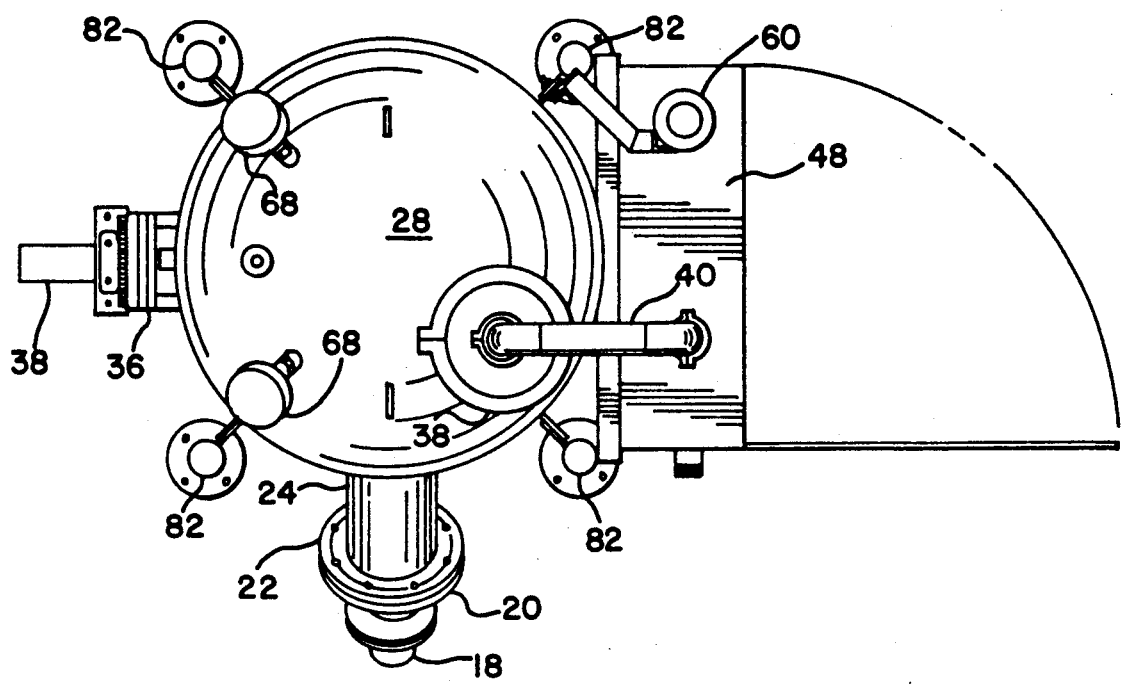
FIG_5_
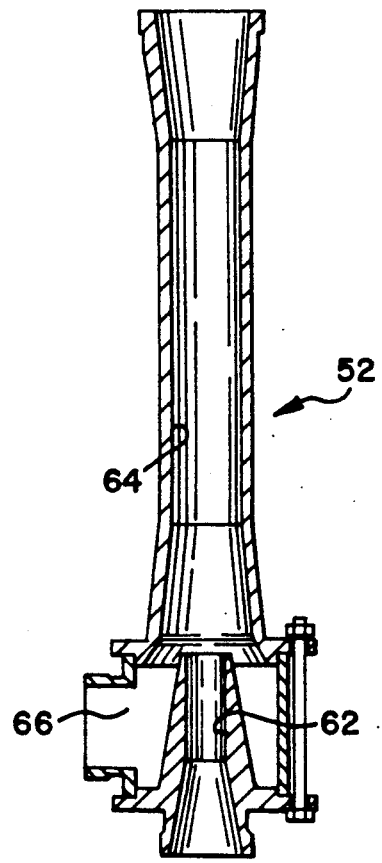
FIG_6_

HIGH EFFICIENCY FEEDER APPARATUS FOR PNEUMATIC CONVEYING LINES

The present invention generally relates to pneumatic conveying of dry particulate materials, and more particularly to an improved feeder apparatus for cyclically conveying such materials from an inlet line to an outlet conveying line by means of a highly efficient feeder apparatus.

Automatic feeder apparatus have now been used for decades for conveying dry particulate material through a conveying line through the use of pneumatic techniques. One of the first apparatus that operated effectively was disclosed in the Black U.S. Pat. No. 3,372,958. The structure of that apparatus generally comprised a substantially closed, generally conically shaped transfer vessel with a material inlet at the top and a material outlet at the bottom, the latter of which was coupled to an outlet chamber where the material exiting the transfer vessel was fluidized and guided to a discharge line which led to the intended location Pressure generating means utilized pressure at a level of close to but less than 15 lbs per square inch and included appropriate valving was provided for continuously supplying a positive air pressure to the chamber for fluidizing the material, and for alternatively establishing a positive and negative air pressure within the interior of the transfer vessel several times a minute for unloading and loading the transfer vessel, respectively. The pressure generating means contained a venturi assembly which was used to create a suction for assisting in filling the transfer vessel. Improvements to the Black apparatus were disclosed in the Jacobson U.S. Pat. No. 4,278,367 and consisted of regulating the pressure in the transfer vessel and utilizing a flap valve to maximize flow without experiencing clogging. The nature of the operation of both of these apparatus was to use a high volume of air under relatively low pressure to accomplish the conveying operation. While such apparatus are extremely effective, one disadvantage is that the efficiency of the loading cycle is often less than desired, and the length of the output conveying line is also less than desired. The venturi assembly operates by applying positive air pressure to a venturi throat having an associated throat chamber in which vacuum pressure is induced. The positive air pressure must be exhausted and in the above described apparatus, it was exhausted to the outlet conveying line to aid in clearing the line after the material was unloaded from the vessel into the line.

Another type of technique for pneumatic conveying uses a low volume of air under significantly higher pressure, with concomitant high material to air ratios, and is generally known in the industry as dense phase conveying. This type of conveying generally results in less degradation of the conveying lines through wear, requires smaller diameter conveying lines with comparable throughput capacities, results in less breakage of the product because of lower conveying velocities, less energy consumption and longer conveying distance capabilities. In this type of conveying operation, the material is typically not cleared from the line, even if it is conveyed in a cyclic manner. One of the disadvantages of this type of conveying is that such systems have traditionally required a large amount of head room because they are gravity loaded. As a consequence, such installations have required a large pit beneath the silo or rail car or the use of a separate filter vessel and vacuum pump for vacuum loading. Such auxiliary equipment or size requirements have significantly increased the manufacturing costs or have been impractical for many applications because of physical constraints.

Accordingly, it is an object of the present invention to provide an improved feeder apparatus that offers the advantages of both of the above types of system, by using both types of operation at different stages of the operation of the apparatus.

It is another object of the present invention to provide an improved feeder apparatus which utilizes a low volume of high pressure air to accomplish loading of the transfer vessel thereof, and which utilizes a low volume of high pressure air to accomplish the unloading of the transfer vessel and to convey the dry particulate material down the output line.

Still another object of the present invention is to provide an improved feeder apparatus that utilizes a venturi for inducing a vacuum for loading a vessel, wherein the venturi outlet is vented to atmosphere rather than the output conveying line, which significantly reduces the back pressure on the venturi outlet and thereby permits greater loading efficiencies to be achieved.

It is yet another object of the present invention to provide such an improved feeder apparatus which carries out such loading, unloading and conveying and which does not require any significant head room in which to operate, provides increased inlet conveying line length capabilities, provides increased outlet conveying line length capability, and operates with lesser energy requirements.

Still another object of the present invention is to provide such an improved feeder apparatus which utilizes in its loading stage a highly efficient venturi for developing a low pressure level for a suction force for pulling the material into the transfer vessel, and the use of relatively high supply pressure for operation in the apparatus during both the loading and unloading stages of operation.

A related object of the present invention lies in the provision of increased efficiency and lower energy consumption due to the utilization of dense phase conveying from the feeder apparatus to the conveying destination, which means that the conveying line to the destination is not required to be cleared of material at the completion of each unloading stage.

Other objects and advantages of the present invention will become apparent upon reading the following detailed description while referring to the attached drawings, in which:

FIG. 1 is a diagrammatic plan view of the apparatus of the present invention and particularly illustrating the operation of the same during the loading stage;

FIG. 2 is a diagrammatic plan view of the apparatus of the present invention and particularly illustrating the operation of the same during the unloading stage;

FIG. 3 is a plan view of the front of the apparatus of the present invention;

FIG. 4 is a plan view of the top of the apparatus of the present invention;

FIG. 5 is a plan view of the end of the apparatus of the present invention; and, FIG. 6 is a cross section of the venturi portion of the apparatus of the present invention.

DETAILED DESCRIPTION

Broadly stated, the present invention comprises an apparatus that is adapted to pneumatically convey dry particulate material from a source to a destination by cyclically loading and unloading a transfer vessel. The loading stage is accomplishing by creating a vacuum pressure within the transfer vessel to pull material into it, and after it is filled to its optimum capacity, switch a number of valves to convert the apparatus to the unloading stage wherein positive pressure is applied to the interior of the vessel to push the material down the output conveying line to its destination. The motive force in the operation of both stages is positive air pressure of at least approximately 60 pounds per square inch (hereinafter referred to 60 lbs). Even though positive air pressure is used in the operation of the apparatus during both the loading and unloading stages of operation, the loading stage is done using vacuum or suction pressure applied to the interior of the vessel, and the vacuum is generating by a high velocity venturi structure in combination with valving and piping which uses the positive air pressure.

The operation of the apparatus is significantly different from that disclosed in the aforementioned patents in at least one critical respect, which is markedly different from merely increasing the air pressure utilized in the apparatus. Another significant difference is in the design of the venturi nozzle which allows supersonic primary air flow thus creating a higher operating vacuum and greater suction efficiency. The significant difference lies in the combination of two technologies that have become known in the industry as dense phase conveying unloading and vacuum loading, which is not dense phase conveying. Certainly the venturi induced vacuum loading is disclosed in the aforementioned patents, and the apparatus of the present invention is conceptually similar, albeit much more efficient, because it utilizes an improved venturi that has been developed by the assignee of the present invention. By utilizing the 60 lb air pressure air supply applied to the venturi, there is air flow through the nozzle on the order of twice the speed of sound, which generates a vacuum pressure of approximately 23 inches of mercury within the vessel. The increased efficiency of the vacuum loading utilizing a 60 lb air supply has demonstrated a literally doubling of the length of the inlet line compared to vacuum loading inlet line lengths achieved with apparatus disclosed in the aforementioned patents.

In accordance with another important aspect of the present invention, the positive air pressure that is applied to the venturi must be exhausted, and in prior feeder apparatus the air has been applied to the outlet conveying line for the purpose of clearing the line of material immediately prior to or while the vessel is being loaded. Because the dense phase conveying is being used during the unloading stage, it is unnecessary and in fact inefficient to clear the outlet conveying line of material. It has also been known that by exhausting the air from the venturi into the outlet conveying line, back pressure is developed that lowers the efficiency of the venturi itself, with the amount of back pressure being proportional to the length of the line. In the present invention, this undesirable back pressure is effectively eliminated by venting the venturi exhaust directly to atmosphere. Because of the extremely high air speeds that are developed, a silencer is usually provided to reduce the noise levels that are produced.

Unlike the aforementioned patents, the unloading stage of operation utilizes the dense phase conveying, which utilizes a high pressure, low volume air supply. The aforementioned patents utilized high volume, low pressure air supply, where the material to air ratio was much lower than is present in the present invention and in other dense phase systems. The advantages of dense phase conveying are many, and include the advantage that the same amount of material can be conveyed using smaller convey line sizes, higher capacities, less particle degradation, less convey line wear and lower energy requirements.

The advantages of marrying the venturi induced vacuum loading and dense phase unloading technologies results in achieving the advantages of each technology, while eliminating the disadvantages of each. This is a significant development for the reason that the vacuum loading eliminates one of the most problematic obstacles that has usually always been present with dense phase conveying.

Typically, dense phase conveying systems either require gravity loading of the vessel, or loading with a vacuum pump having a filter structure. Such loading systems in turn requires a substantial amount of head room above the vessel to load it. Because of the head room requirements, installations typically require a large pit beneath the silo or rail car which is to be unloaded, or a separate filter and vacuum pump are required. As might be expected, such equipment must be sizeable to operate effectively, and for that reason, are often expensive. The present invention has a filter that is located within the vessel itself, thereby requiring no additional head room, and through the use of the venturi structure, eliminates the need for a separate vacuum pump.

It should also be readily appreciated that constructing pits beneath silos is also very expensive, and often totally impractical. Constructing pits beneath rail sidings is similarly expensive, and greatly reduces the flexibility of use of any system, since each location for unloading must have its own pit.

Turning now to the drawings and particularly FIGS. 1 and 2, the apparatus of the present invention is shown diagrammatically during the loading and unloading stages of operation, respectively. The apparatus, indicated generally at 10, has a closed vessel 12 that is generally cylindrical upper side portion 14 and a generally conical lower side portion 16. A material inlet conduit 18 terminates at an annular flange 20 that is conventionally bolted to a similar flange 22 that is attached to a cylindrical portion 24 of the vessel. An interiorly attached conduit 26 extends from the flange 24 to an elevation near a domed shaped top portion 28. A flap valve 30 is secured to the upper end of the conduit 26 and opens to admit the material being conveyed during the load stage and is biased to close when material is not moving through the conduit 26.

The bottom of the vessel terminates in an outlet conduit portion that has an upper vertical section 32 and a lower horizontal section 34 that is attached to a discharge valve 36 that is preferably pneumatically and optionally electrically controlled so that it is closed during loading and open during unloading. An outlet conveying line 38 is attached to the valve 36 and extends to the destination where the material is to be conveyed.

The domed top 28 of the vessel 12 has a cylindrical portion 38 which communicates the vacuum pressure or positive air pressure to the interior of the vessel via conduit 40 which may conveniently be fabricated in sections suitably attached to one another by clamps 42 and to an inlet port connected to the top of the cylindrical portion 38. A filter 46 is provided to minimize dust from the material being communicated to the conduit 40 during the loading stage which would eventually be exhausted to atmosphere. The exhausting of dust is environmentally undesirable and also may have a detrimental effect on the internal surfaces of the venturi over time.

Since the positive air pressure is also introduced through the conduit 40, the flow of air in the opposite direction has the effect of cleaning the filter elements during each unloading stage of a loading and unloading cycle. The conduit extends to a control cabinet 48 that is of sufficient size to include conduit sections, electrical and pneumatic controls and the previously mentioned venturi structure. The conduit 40 has a "T" section that branches the conduit 40 to sections 40a and 40b. Section 40b is connected to section 40c which in turn branches via a "T" section to sections 40d and 40e. Section 40e is connected to a source 50 of positive air pressure having a preferred pressure of 60 lbs per square inch. Section 40d is connected to a venturi structure 52, as is the section 40a.

Each of the sections 40a, 40c and 40d have preferably pneumatic valves that are selectively controlled to be open or closed during operation in the loading and unloading stages. More particularly, a suction valve 54 is located in section 40a, a convey valve 56 is located in section 40c and a venturi supply valve 58 is located in conduit section 40d. A silencer 60 is provided and attached to the upper end of the venturi structure 52. As previously mentioned, the air flow through the throat of the venturi is supersonic, which creates a substantial noise and therefore a silencer is needed in most installations.

Referring to FIG. 6 which illustrates the venturi structure 52, it has a venturi nozzle 62 which is connected to conduit section 40d. The nozzle has an opening in its upper end and directs a flow of air into the lower end of a venturi throat section 64, the upper end of which is connected to the silencer 60. The venturi structure 52 has a chamber 66 which is in communication with the conduit section 40a. During operation of the venturi structure, air is directed through the nozzle 62 into the throat section 64, creating a substantially lower air pressure or vacuum in the chamber 66 and conduit section 40a.

Returning to FIG. 1, and in connection with the loading stage of the apparatus during operation, the source of positive air pressure 50 supplies air in section 40e, 40d and to the venturi nozzle 62. During loading, the valves 54 and 58 are open and valve 56 is closed. A vacuum is then induced in conduit sections 40a and 50, and in the vessel 12. The material discharge valve 36 is also closed so that the material present in the inlet is vacuum loaded into the vessel. When it reaches a predetermined elevation as determined by one or the other of two level switches 68 (see FIGS. 3 and 5), the loading stage is terminated and the unloading stage is commenced.

To unload the vessel and convey the material down the output line 38, and referring to FIG. 2, the valves 54 and 58 are closed, valves 56 and 36 are opened. This permits positive air pressure to be applied to the interior of the vessel via conduit sections 40e, 40c, 40b and 40.

The operation of the apparatus is essentially as described above, and the apparatus shown in FIGS. 3, 4, 5 and 6 illustrate the actual apparatus, where like reference numerals refer to the same components as have been described in connection with FIGS. 1 and 2. In addition to the operation as previously described, the actual apparatus includes other features which will be described in connection with FIGS. 3, 4 and 5.

More particularly, the apparatus includes structure for injecting supplemental air into the material during the unloading stage of operation, and to this end, air supply lines 70, 72 and 74 are provided to inject air into either the vessel or the conduit 32 and output line 38. The line 70 is connected to a circular manifold or aeration ring 76 which injects air into the upper portion of the conduit 32 to aerate the material so that it will flow more easily. Similarly, lines (one of which is shown) 78 extend from the aeration ring 76 to aeration pads 80 which inject air into the conical portion of the vessel. While the number of such pads is not critical, it is preferred that at least six of such pads be provided. Line 72 injects air into the lower portion of the conduit 32 and line 74 injects air into the output line 38 at regular intervals along its length. As is conventional, leg assemblies 82 provide structural support for the vessel. As shown in FIG. 5, a pressure relief valve 84 is provided to protect the apparatus from excessive pressure in the event a malfunction occurs which results in a build up of pressure the vessel.

From the foregoing description, it should be appreciated that an improved apparatus for conveying dry particulate material has been set forth which provides the advantages of a venturi generated vacuum loading and dense phase unloading, which operations result in a highly efficient apparatus in terms of energy consumption. The apparatus also provides extreme flexibility in that it requires no construction of pits below silos or rail sidings, and can be utilized at virtually any realistic location without incurring the expense of construction. The advantages of dense phase conveying are achieved, as are those of a venturi generated vacuum loading.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. A feeder apparatus for cyclically loading and unloading particulate material during loading and unloading stages and for injecting the same into an outlet conveying line under positive air pressure during the unloading stage, said apparatus being adapted to be connected to a source of positive air pressure, said apparatus comprising:

a substantially closed transfer vessel means having a material inlet, a material inlet valve, a material outlet and material outlet valve, said material outlet valve being adapted to be connected to an outlet conveying line, said material inlet valve being operable to admit material into the upper portion of said vessel means in response to the material being forced through said material inlet, said transfer vessel means being generally cylindrical with a generally conical lower portion;

venturi means having an inlet, an outlet and a throat chamber, said venturi means being adapted to receive positive air pressure at the inlet thereof and to generate a negative or vacuum pressure in said throat chamber in response to positive air pressure being applied to said inlet, the outlet being vented to atmosphere;

conduit means being adapted to provide fluid communication between said vessel means and the source, being adapted to provide fluid communication between the source and said venturi means, and being adapted to provide fluid communication between said venturi means and said vessel means;

remotely actuable valve means located in said conduit means and said vessel means for controlling fluid communication between said vessel means and the source, for controlling fluid communication between the source and said inlet of said venturi means, and for controlling fluid communication between said throat chamber of said venturi means and said vessel means; and, control means for controlling the operation of said valve means for providing fluid communication between said venturi throat chamber of said venturi means and said vessel means, between the source and the inlet of said venturi means, and for closing said vessel means outlet valve to provide a vacuum pressure in the vessel means to draw material into said vessel means during the loading stage;

said control means providing fluid communication between the source and said vessel means, and blocking fluid communication between the source and said inlet of said venturi means and blocking fluid communication between said venturi throat and said vessel means, said control means opening said vessel means outlet valve to inject material into the outlet conveying line during the unloading stage.

2. Apparatus as defined in claim 1 wherein said vessel means further includes filter means in communication with said conduit means, said filter means being provided for cleansing the air that is removed from the interior cf said vessel means during the loading stage.

3. Apparatus as defined in claim 2 wherein said conduit means is connected to said vessel means such that when vacuum pressure is applied thereto, the air that is removed passes through said filter means, said conduit means also applying the positive air pressure to said vessel means so that the air also passes through said filter means, the combination of passing air in both directions through the filter means being effective to clean the filter means during cycling between the loading and unloading stages of operation.

4. Apparatus as defined in claim 1 further including a silencing means attached to the outlet of said venturi means.

5. Apparatus as defined in claim 1 wherein said conduit means comprises a first rigid conduit extending between said vessel means and said source, a second rigid conduit extending between said source and said venturi inlet a third rigid conduit extending between said first conduit and said venturi means throat chamber, said valve means comprising a first valve located in said first conduit, a second valve located in said second conduit and a third valve located in said third conduit.

6. Apparatus as defined in claim 5 wherein each of said valves comprises a pneumatically actuable butterfly valve.

7. Apparatus as defined in claim 1 further including a level switch positioned in the upper portion of said vessel means adapted to provide a signal to said control means in response to the material reaching a predetermined level during said loading stage.

8. A feeder apparatus for cyclically loading and unloading particulate material during loading and unloading stages and for injecting the same into an outlet conveying line under positive air pressure during the unloading stage, said apparatus being adapted to be connected to a source of positive air pressure, said apparatus comprising:

a substantially closed transfer vessel means having a material inlet, a material inlet valve, a material outlet and material outlet valve, said material outlet valve being adapted to be connected to ann outlet conveying line, said material inlet valve being operable to admit material into the upper portion of said vessel means in response to the material being forced through said material inlet, said transfer vessel means being generally cylindrical with a generally conical lower portion;

venturi means having an inlet, an outlet and a throat chamber, said venturi means being adapted to receive positive air pressure at the inlet thereof and to generate a negative or vacuum pressure in said throat chamber in response to positive air pressure being applied to said inlet, said outlet venting said positive air pressure after having induced a vacuum in said vessel means, said outlet being in communication to atmosphere;

conduit means being adapted to provide fluid communication between said vessel means and the source, being adapted to provide fluid communication between the source and said venturi means, and being adapted to provide fluid communication between aid venturi means and said vessel means;

valve means located in said conduit means and said vessel means for controlling fluid communication between said vessel means and the source, for controlling fluid communication between the source and said inlet of said venturi means, and for controlling fluid communication between said throat chamber of said venturi means and said vessel means; and, control means for controlling the operation of said valve means for providing fluid communication between said venturi throat chamber of said venturi means and said vessel means, between the source and the inlet of said venturi means, and for closing said vessel means outlet valve to provide a vacuum pressure in the vessel means to draw material into said vessel means during the loading stage;

said control means providing fluid communication between the source and said vessel means, and blocking fluid communication between the source and said inlet of said venturi means and blocking fluid communication between said venturi throat and said vessel means, said control means opening said vessel means outlet valve to inject material into the outlet conveying line during the unloading stage;

said control means switching between the loading and unloading stages during operation, the control means switching from the loading stage to the unloading stage in response to said vessel means being filled with material to a predetermined level, and switching from the unloading stage to the loading stage in response to said vessel means being substantially emptied of material, but before the conveying line is emptied of material.

9. Apparatus as defined in claim 8 wherein said outlet of said venturi means is vented to the atmosphere.

10. Apparatus as defined in claim 9 further including a silencing means attached to the outlet of said venturi means.

11. Apparatus as defined in claim 8 wherein said conduit means comprises a first rigid conduit extending between said vessel means and said source, a second rigid conduit extending between said source and said venturi inlet, a third rigid conduit extending between said first conduit and said venturi means throat chamber, said valve means comprising a first valve located in said first conduit, a second valve located in said second conduit and a third valve located in said third conduit.

12. Apparatus as defined in claim 11 wherein each of said valves comprises a pneumatically actuable butterfly valve.

13. A feeder apparatus for cyclically loading and unloading particulate material during loading and unloading stages and for injecting the same into an outlet conveying line under positive air pressure during the unloading stage, said apparatus being adapted to be connected to a source of positive air pressure, said apparatus comprising:

a closed transfer vessel means having a material inlet, a material inlet valve, a material outlet and material outlet valve, said material outlet valve being adapted to be connected to an outlet conveying line, said material inlet valve being operable to admit material into the upper portion of said vessel means in response to the material being forced through said material inlet, said transfer vessel means being generally cylindrical with a generally conical lower portion;

venturi means having an inlet, an outlet and a throat chamber, said venturi means being adapted to receive positive air pressure at the inlet thereof and to generate a negative or vacuum pressure in said throat chamber in response to positive air pressure being applied to said inlet, said venturi outlet being vented to the atmosphere;

conduit means being adapted to provide fluid communication between said vessel means and the source, being adapted to provide fluid communication between the source and said venturi means, and being adapted to provide fluid communication between said venturi means and said vessel means;

filter means operable associated with said vessel means and said conduit means to filter air that is removed from the interior of said vessel means and being adapted to be cleaned when positive air pressure is applied to the interior of said vessel means;

valve means located in said conduit means and said vessel means for controlling fluid communication between said vessel means and the source, for controlling fluid communication between the source and said inlet of said venturi means, and for controlling fluid communication between said throat chamber of said venturi means and said vessel means; and, control means for controlling the operation of said valve means for providing fluid communication between said venturi throat chamber of said venturi means and said vessel means, between the source and the inlet of said venturi means, and for closing said vessel means outlet valve to provide a vacuum pressure in the vessel means to draw material into said vessel means during the loading stage;

said control means providing fluid communication between the source and said vessel means, and blocking fluid communication between the source and said inlet of said venturi means and blocking fluid communication between said venturi throat and said vessel means, said control means opening said vessel means outlet valve to inject material into the outlet conveying line during the unloading stage;

said control means switching between the loading and unloading stages during operation, the control means switching from the loading stage to the unloading stage in response to said vessel means being filled with material to a predetermined level, and switching from the unloading stage to the loading stage in response to said vessel means being substantially emptied of material, but before the conveying line is emptied of material.

14. Feeder apparatus for conveying dry particulate material from a material inlet line to a material outlet line by passing material therethrough, said apparatus comprising:

a transfer vessel means having a material inlet, a material inlet valve, a material outlet and material outlet valve, said material outlet valve being adapted to be connected to an outlet conveying line, said material inlet valve being operable to admit material into the upper portion of said vessel means in response to the material being forced through said material inlet;

venturi means for inducing a vacuum in said vessel means in response to positive air pressure being applied thereto, said venturi means having an outlet through which said positive air pressure is vented after having induced a vacuum in said vessel means, said outlet being in communication to atmosphere;

means for applying positive air pressure to the interior of said vessel means;

control means for applying vacuum or positive pressure to the interior of said vessel means, said control means applying vacuum pressure to said vessel means said control means opening said vessel means outlet valve to inject material into the outlet conveying line during the unloading stage;

said control means switching between the loading and unloading stages during operation, the control means switching from the loading stage to the unloading stage in response to said vessel means being filled with material to a predetermined level, and switching from the unloading stage to the loading stage after the unloading stage is completed.

* * * * *